United States Patent Office 3,489,726
Patented Jan. 13, 1970

3,489,726
METHOD OF POLYMERIZATION OF LACTAMS
Zbynek Bukac and Jan Sebenda, Prague, Czechoslovakia, assignors to Ceskoslovenska Akademie ved, Prague, Czechoslovakia
No Drawing. Continuation-in-part of application Ser. No. 590,506, Oct. 31, 1966. This application Oct. 6, 1967, Ser. No. 673,310
Claims priority, application Czechoslovakia, Nov. 11, 1965, 6,727/65
Int. Cl. C08g 20/18, 20/12, 20/10
U.S. Cl. 260—78                 13 Claims

ABSTRACT OF THE DISCLOSURE

The method of polymerizing lactams of the general formula

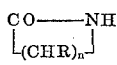

wherein R is hydrogen or lower alkyl having from one to three carbon atoms, and wherein n is from 5 to 11, comprising polymerizing the lactam at a temperature between 120 and 280° C. in the presence of a metal salt of a $\beta$-keto-amide catalyst of the general formula

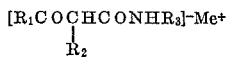

wherein $R_1$, $R_2$ and $R_3$ may be the same or different and wherein $R_1$ and $R_3$ is alkyl having from 1 to 18 carbon atoms, cycloalkyl, aryl or aralkyl, $R_2$ is alkyl having from 1 to 18 carbon atoms, cycloalkyl or aralkyl, and Me is the cation of an alkali metal salt or alkaline earth metal salt.

The catalyst may be used in an amount from 0.025 to 3 molar percent relative to the molar amount of the lactam. An example of the catalyst is $\alpha$-butyryl-N-ethylbutyramide.

CROSS-REFERENCE TO RELATED APPLICATIONS

This application is a continuation-in-part of the application Ser. No. 590,506 of the same inventors which is assigned to the same assignee, filed Oct.. 31, 1966 and now abandoned.

BACKGROUND OF THE INVENTION

The polymerization of lactams presents a difficult problem. The rate of polymerization is greatly accelerated towards and about the melting-point of the monomer, but in this temperature area the amount of unpolymerized monomer in the final reaction product is rather high. Substantially below the melting point, the reaction proceeds at a much slower rate, but with smaller amount of unreacted monomer.

Only the polymerization rate depends on the type of catalyst used. Equilibrium does not depend on the catalyst but rather is determined by a known curve (see Hermann Klare, Technologie u. Chemie der Synth. Fasern aus Polyamiden, Berlin, 1954). However, with a suitable catalyst, the polymerization rate can be increased.

Thus, the use of a catalyst in the form of a salt of caprolactam formed by reacting caprolactam with an alkali metal or a hydride thereof has been proposed to achieve a rapid polymerization of caprolactam at temperatures of about 250° C. The preferred type of catalyst in this reaction is a sodium or potassium salt of caprolactam; see U.S. Patent No. 2,251,519. However, the effects of these catalysts decreases rapidly at temperatures below 220° C. For instance, in the presence of 0.5 mol percent of the sodium salt of caprolactam only 10% of the polymer is formed during a polymerization at 200° C. for ten minutes.

It has therefore also been proposed to add to this type of alkaline polymerization an additional activator, such as acyl caprolactam or an anhydride or chloride of a carboxylic acid. The activator permits the alkaline polymerization to proceed at a higher rate even at lower temperatures; see Czechoslovak Patent No. 93016.

However, this method, notwithstanding the better polymerization rate, has certain shortcomings. The polymerization thus accomplished is every rapid at temperatures as low as about 100° C. The polymerization therefore occurs at a substantial rate immediately after mixing the caprolactam solution of the sodium salt with the activator such as acetanhydride. It is therefore impossible to keep the initial reaction mixture in the melted state for longer than a few minutes. This is a substantial handicap, since if the reaction mixture in the melted state were more stable, the solution of the catalytic components, for example of the sodium sal of caprolactam and acylchloride, in caprolactam could be preserved in hermetically sealed vessels for an extended period of time. The reaction mixture could thus, for instance, be prepared for subsequent polymerization casting or continuous polymerization while shaping the polymer; see Czechoslovak Patents Nos. 97,332 and 97,333. Also, the two-component catalytic system of an initiator and an activator such as the mixture of a sodium salt of caprolactam and an acetyl caprolactam quickly loses its catalytic properties at temperatures of about 200° C. Thus, the monomer-polymer equilibrium can take place only under narrowly defined temperature conditions.

It has also been proposed for these reasons to use three-component buffered catalytic systems, such as the caprolactam sodium salt plus an activator plus a phenol, but in this case three components were necessary, which increased the cost and made the procedure technically rather difficult.

SUMMARY OF THE INVENTION

It is therefore an object of the present invention to avoid these difficulties and to provide for a catalytic system for the polymerization of lactam which permits proceeding at a broad range of temperatures at a good rate of polymerization.

It is a further object of the invention to provide a catalytic system of this type which even at high temperatures does not loose its catalytic action and which can be pre-prepared and preserved for long periods of time.

These objects are met by effecting the polymerization of lactams of the general formula

wherein R is hydrogen or lower alkyl having from 1 to 3 carbon atoms, and wherein n is from 5 to 11, in the presence of a catalyst comprising a metal salt of a $\beta$-keto-amide of the general formula

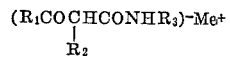

wherein $R_1$, $R_2$ and $R_3$ may be the same or different and wherein $R_1$ and $R_3$ are alkyl having from 1 to 18 carbon atoms, cycloalkyl, aryl, or aralkyl, $R_2$ is alkyl having from 1 to 18 carbon atoms, cycloalkyl or aralkyl, and Me is the cation of an alkali metal salt or alkaline earth metal salt.

DESCRIPTION OF THE PREFERRED EMBODIMENTS

As has been pointed out, the present invention is directed to an alkaline polymerization of lactams by means of a one-component catalyst of the formula above stated. Examples of suitable catalysts are, for instance, alkaline metal salts of the compounds listed below. A synopsis of the radicals present in these compounds is given in the table following the names of the compounds (the Roman numerals following the names refer to the table): α-butyryl - N - ethylbutyramide (I); and α-butyryl-N-phenylbutyramide (II).

Also useful are the following derivatives of 2-ethyl-3-oxohexane carboxylic acid: the N-methylamide (III); N-(2' and 1' - naphthyl) - amide (IV and V); N-(4'-phenyl)-anilide (VI); N-cyclohexylamide (VII); N-(3', 4'-xylidide (VIII); N-benzylamide (IX); and N-(p-tolyl)-amide (X).

Another example would be the N-methylamide of 2-hepta-decyl-3-oxo-nonadekanecarboxylic acid (XI).

Useful in the present invention are also: α-benzyl-acetoacetanilide (XII); as well as α-methyl-acetoacetanilide (XIII), and α-cyclohexyl acetoacetanilide (XIV).

Another useful catalyst is 2-ethyl-3-oxo - hexanecarboxylic acid anilide (XV) as well as the corresponding α-cyclohexanoyl propionanilide (XVI).

The polymerization is applicable to various lactams such as 6-caprolactam, an isomeric mixture of methyl caprolactams and 7-enantholactam.

The reaction proceeds at the temperature range between 120 and 280° C., preferably at a temperature between 175° and 220° C.

The amount of catalyst should be within the range of 0.025 to 3 molar percent and preferably should be about 0.5 mol percent relative to 100 mols of lactam. As in other reactions involving anionic lactam polymerization, the starting material should be used in an anhydrous condition.

The salts of the ketoamides which are particularly useful for the reaction are the sodium salt and also the lithium and potassium salts. The calcium salt may also be used.

The time of the polymerization may be varied widely and preferably is about one hour.

There are thus obtained polymerizates containing usually from 90 to above 97% of the polymer.

The β-ketoamides which are used herein are made in conventional manner by using, for instance, dimeric ketones and amines as starting materials, as described in Y. Sauer: J. Am. Chem. Soc. 69, 2444 (1947); Hasek, R. H., Clark, R. D., Elam, E. U., Martin, J. C.: J. Org. Chem. 27, 60 (1962). The preparation of the metal salts is described, for instance, in Houben-Weyl; Die Methoden der organischen Chemie, 6/2, p. 55 (1963).

By virtue of the catalysts, as described, the polymerization proceeds at a relatively slow pace at temperatures around 100° C., while it is much more rapid at temperatures around 200°. The catalytic action of the catalyst is retained for an extended period of time at elevated temperatures. Thus, a polymerizate with a low monomer content can easily be prepared following in other respects the method disclosed, for instance, in British Patent No. 944,307, which involves a two-step method wherein the polymerization is effected first above the melting point of the polyamide and then, at temperatures between 10 and 50° C. below the melting point. In the second stage, the content of water-soluble substance is reduced from about 8% to about 3%. While the catalytic system disclosed in the patent mentioned had a rather short lifetime, the present catalyst permits preserving the catalyst for extended periods.

It is also noted that salts of β-ketoamides are not as strongly basic as caprolactam salts. Their preparation and handling does, therefore, not involve as much difficulty as were encountered with the prior art catalysts.

The invention permits processing of the polymerization mixture practically at any desired time after its manufacture, since the catalyst-lactam solution can be stored under normal temperature for almost an unlimited period of time, for example in the form of pellets or in the form of a solidified melt maintained in a hermetically sealed vessel.

It is, however, necessary to effect the reaction under anhydrous conditions, since an anionic polymerization reaction is highly sensitive to moisture and acids.

The following examples will further illustrate the invention without limiting its scope. The Roman numerals following the names of the compounds refer to above table.

Example I

To $7.1 \times 10^{-3}$ mol α-butyryl-N-ethyl butyramide (I) were added 2 ml. of a xylene suspension of 3.55 M NaH in a dry nitrogen atmosphere. After converting the β-ketoamide to its sodium salt and distilling off xylene in vacuo, $7.03 \times 10^{-1}$ mol 6-caprolactam was added and at a temperature of 80–100° C. a homogeneous solution of the β-ketoamide sodium salt in 6-caprolactam was prepared. This solution was filled into ampules under a dry nitrogen atmosphere and the ampules were sealed. Polymerization was later carried out at 175° C. After 60 minutes the polymerizate contained 97.6% of polymer (equilibrium value).

Example II 6-caprolactam was polymerized in the same manner as described in Example I, but the corresponding potassium salt of the ketoamide was used as catalyst. The reaction time was 120 minutes and the reaction temperature 180° C. There was obtained a yield of 96.9% polymer, the balance being monomer and oligomers. The same results were obtained when using the lithium salt of the ketoamide.

Example III

The same lactam and the same catalyst were used as in Example I, but the polymerization was first effected for 5 minutes at 210° C. and was then continued for 60 minutes at 175° C. A yield of 97% of the high molecular polyamide was obtained.

Example IV

A polymerization mixture was prepared containing 0.3 mol percent of the sodium salt of α-benzylacetoacetanilide (XII) and 6-caprolactam. The polymerization was carried out at 200° C. for a period of 15 minutes, otherwise following the rules given in Example I. The yield was about 90% of the high molecular polyamide.

Example V

The polymerization was effected in the same manner as in Example IV with the same amount of catalyst but using α-methylacetoacetanilide. About the same amount of polymer was obtained.

This experiment was then repeated with the same results using α-cyclohexylacetoacetanilide.

Example VI

A solution of 0.2 mol percent of the sodium salt of α-benzoyl-propionanilide (XVII) and 0.1 mol percent of 2-ethyl-3-oxo-hexanecarboxylic acid anilide (II) was heated to 180° C. for a period of 60 minutes. The polymerizate contained 96.9% of the high molecular polymer.

This test was repeated with the same amounts of catalyst but using the α-cyclohexanoyl propionanilide (XVI). About the same result was obtained.

Example VII 0.015 mol percent of the sodium salt of α-butyryl-N-octadecylbutyramide (XV) was dissolved in anhydrous methylcaprolactam (a mixture of isomers). After 70 minutes heating to 210° C., a polymerizate with equilibrium content of the polymer and monomer was obtained. The yield of high molecular polymer was 85%.

Example VIII

Similar to Example VII, a solution of 0.02 mol percent of the sodium salt of α-butyryl-N-butyranilide (II) in 0.7 mol percent of 6-caprolactam and 0.3 mol percent of an isomeric mixture of C-methylcaprolactams was polymerized. The polymerizate contained equilibrium amounts of the copolymer and monomers. The temperature of the polymerization reaction was 210° C., the time 70 minutes, and the total yield of high molecular polymer was 85%.

Example IX

In the manner described in Example I, 7-enantholactam was polymerized instead of 6-caprolactam. The polymerizate contained about 3% (weight) of water-soluble substances and 97% of the polymer. The temperature was 170° C. and the time 60 minutes.

Example X

The same polymerization reaction as in Example IX was carried out with 12-dodecanoic acid lactam (dodecanolactam).

Example XI

The magnesium salt of 2-ethyl-3-oxo-hexane carboxylic acid anilide was prepared by reacting $1.42 \times 10^{-2}$ mol of the corresponding β-ketoamide with $3 \times 10^{-3}$ mol of magnesium hydride. The salt was then dissolved in $7.3 \times 10^{-1}$ mol of 6-caprolactam. The polymerization was effected at 210° C. for a period of 100 minutes. A crystalline polymerizate was obtained in a yield of over 90%.

Example XII

The initial solution of catalyst in caprolactam prepared according to Example I was heated for 2 hours to 100° C. During this time the reaction mixture remained clear and after heating to 175° C. for a period of 60 minutes a polymer containing 3% of water-extractable substances was formed.

Example XIII

The catalyst solution in caprolactam prepared according to Example I after solidification was pelleted in the atmosphere of dry inert gas. After 30 days, the pellets were melted in a polymerization apparatus at 100° C., and, after degassing, the reaction mixture was heated to 210° C. for a period of 5 minutes. When cooled down, the product contained 92% of polymer. A portion of this polymer was reheated for 1 hour to 175° C., whereby the content of water-extractable substances decreased to 3%.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. The method of polymerizing lactams of the general formula

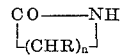

wherein R is hydrogen, or lower alkyl having from 1 to 3 carbon atoms, and wherein n is from 5 to 11, comprising polymerizing the lactam under substantially anhydrous conditions at a temperature between 120 and 280° C. in the presence of a catalytic amount of a metal salt of a β-ketoamide of the general formula

wherein $R_1$, $R_2$ and $R_3$ may be the same or different and wherein $R_1$ and $R_3$ are alkyl having from 1 to 18 carbon atoms, cycloalkyl, aryl or aralkyl, $R_2$ is alkyl having from 1 to 18 carbon atoms, cycloalkyl or aralkyl, and Me is the cation of an alkali metal salt or alkaline earth metal salt.

2. The method of claim 1 wherein the ketoamide is present in an amount from 0.025 to 3 molar percent relative to the molar amount of the lactam.

3. The method of claim 1, wherein the metal salt of the β-ketoamide is selected from the group consisting of the sodium, potassium and lithium salts.

4. The method of claim 1, wherein the β-ketoamide is selected from the group consisting of α-butyryl-N-ethylbutyramide, α-butyryl-N-phenylbutyramide.

5. The method of claim 1, wherein the β-ketoamide is selected from the group consisting of α-methyl-acetoacetanilide and α-cyclohexyl-acetoacetanilide.

6. The method of claim 1, wherein the β-ketoamide is selected from the group consisting of α-benzoyl-propionanilide and α-cyclohexonyl-propionanilide.

7. The method of claim 1, wherein the temperature is between 175 and 210° C.

8. The method of claim 2, wherein the catalyst is used in an amount of 0.5 mol percent relative to the molar amounts of lactam.

9. The method of claim 1, wherein the lactam is 6-caprolactam.

10. The method of claim 1, wherein the lactam consists of an isomeric mixture of methylcaprolactams.

11. The method of claim 1, wherein the lactam is selected from the group consisting of enantholactam and dodecanolactam.

12. The method of polymerizing ε-caprolactam, comprising polymerizing a substantially anhydrous caprolactam under substantially anhydrous conditions at a temperature between about 175° and 210° C. in the presence of a metal salt of a β-ketoamide of the general formula

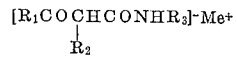

wherein $R_1$, $R_2$ and $R_3$ may be the same or different and wherein $R_1$ and $R_3$ are alkyl having from 1 to 18 carbon atoms, cycloalkyl, aryl or aralkyl, $R_2$ is alkyl having from 1 to 18 carbon atoms, cycloalkyl or aralkyl, and Me is the cation of an alkali metal salt or alkaline earth metal salt, the catalyst being present in an amount of between 0.2 and 3 molar percent relative to the 100 mol of the ε-caprolactam.

13. A mixture of a substantially anhydrous ε-caprolactam with 0.2–3.0 molar percent, relative to 100 mol of the ε-caprolactam, of a β-ketoamide of the general formula

wherein $R_1$, $R_2$ and $R_3$ may be the same or different and wherein $R_1$ and $R_3$ are alkyl having from 1 to 18 carbon atoms, cycloalkyl, aryl or aralkyl, $R_2$ is alkyl having from 1 to 18 carbon atoms, cycloalkyl or aralkyl, and Me is the cation of an alkali metal salt or alkaline earth metal salt, the said mixture being storable in an air-tight container at room temperature and being polymerizable in the absence of oxygen and water at temperatures above 100° C. without addition of a further catalyst or activator.

References Cited

UNITED STATES PATENTS

| | | | |
|---|---|---|---|
| 2,241,321 | 5/1941 | Schlack | 260—78 |
| 2,241,323 | 5/1941 | Greenewalt | 260—78 |
| 3,017,391 | 1/1962 | Mottus et al. | 260—78 |
| 3,037,003 | 5/1962 | Griehl | 260—78 |
| 3,166,533 | 1/1965 | Wichterle et al. | 260—78 |
| 3,309,343 | 3/1967 | Darnell et al. | 260—78 |

HAROLD D. ANDERSON, Primary Examiner

U.S. Cl. X.R.

252—188.1; 260—78